United States Patent
Bruce

(10) Patent No.: US 7,094,022 B2
(45) Date of Patent: Aug. 22, 2006

(54) VARIABLE STATOR VANE BUSHINGS AND WASHERS

(75) Inventor: Robert W. Bruce, Loveland, OH (US)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 10/445,428

(22) Filed: May 27, 2003

(65) Prior Publication Data

US 2004/0240991 A1 Dec. 2, 2004

(51) Int. Cl.
F01D 17/16 (2006.01)

(52) U.S. Cl. .................................................. 415/160
(58) Field of Classification Search ............... 384/297, 384/907.1, 902; 415/160, 151, 159, 162, 415/191, 200, 229
See application file for complete search history.

(56) References Cited

U.S. PATENT DOCUMENTS

| | | | | |
|---|---|---|---|---|
| 3,711,171 A | * | 1/1973 | Orkin et al. ............. 384/907.1 |
| 3,873,168 A | | 3/1975 | Viola et al. | |
| 4,163,364 A | * | 8/1979 | Shirato et al. ............. 415/160 |
| 5,536,022 A | | 7/1996 | Sileo et al. | |
| 5,622,473 A | | 4/1997 | Payling | |
| 5,807,072 A | | 9/1998 | Payling | |
| 6,086,327 A | | 7/2000 | Mack et al. | |
| 6,139,261 A | | 10/2000 | Bishop et al. | |
| 6,146,093 A | * | 11/2000 | Lammas et al. ............ 415/160 |
| 6,170,990 B1 | | 1/2001 | Hawkins | |
| 6,184,333 B1 | | 2/2001 | Gray | |
| 6,264,369 B1 | | 7/2001 | Mesing et al. | |
| 6,474,941 B1 | | 11/2002 | Dingwell et al. | |
| 6,481,960 B1 | | 11/2002 | Bowen | |
| 2001/0016091 A1 | | 8/2001 | Mesing et al. | |
| 2001/0022934 A1 | | 9/2001 | Mashey | |
| 2002/0071760 A1 | | 6/2002 | Dingwell et al. | |
| 2002/0154991 A1 | | 10/2002 | Bowen | |

* cited by examiner

Primary Examiner—Edward K. Look
Assistant Examiner—Richard A. Edgar
(74) Attorney, Agent, or Firm—McNees Wallace & Nurick LLC

(57) ABSTRACT

Materials, heretofore unknown for use in bearing assemblies, which produce equal or better wear resistance at reduced materials cost have been identified. These alternatives fall into three general categories: (1) solid materials from which bushings and washers can be fabricated, (2) coatings bonded to metallic bushings and/or vanes to minimize total system wear, and (3) solid lubricant coatings placed on any bushing or vane stem to reduce friction.

34 Claims, 3 Drawing Sheets

VARIABLE STATOR VANE BUSHINGS AND WASHERS

FIELD OF THE INVENTION

This invention relates generally to components of gas turbine engines, and in particular, to variable stator vane bushings and washers used in the compressor section of the engine.

BACKGROUND OF THE INVENTION

In gas turbine engines, for example, aircraft engines, air is drawn into the front of the engine, compressed by a shaft-mounted rotary compressor, and mixed with fuel. The mixture is burned, and the hot exhaust gases are passed through a turbine mounted on a shaft. The flow of gas turns the turbine, which turns the shaft and drives the compressor. The hot exhaust gases flow from the back of the engine, providing thrust that propels the aircraft forward.

Gas turbine engines generally include a high pressure compressor, a combustor, and a high pressure turbine. The high pressure compressor, combustor, and high pressure turbine are sometimes collectively referred to as a core engine. Such gas turbine engines also may include a low pressure compressor for supplying compressed air, for further compression, to the high pressure compressor, and a fan for supplying air to the low pressure compressor.

The high pressure compressor typically includes a rotor surrounded by a casing. The casing is typically fabricated to be removable, such as by forming the casing into two halves that are then removably joined together. The high pressure compressor includes a plurality of stages and each stage includes a row of rotor blades and a row of stator vanes. The casing supports the stator vanes, and the rotor supports the rotor blades. The stator vane rows are between the rotor blade rows and direct air flow toward a downstream rotor blade row.

Variable stator vane assemblies are utilized to control the amount of air flowing through the compressor to optimize performance of the compressor. Each variable stator vane assembly includes a variable stator vane which extends between adjacent rotor blades. The variable stator vane is rotatable about an axis. The orientation of the variable stator vane affects air flow through the compressor.

A known variable vane assembly includes a variable vane; a trunnion seal, for example, a bushing; and a washer. The variable vane assembly is bolted onto a high pressure compressor stator casing and the bushing and washer surround an opening that extends through the casing. The variable vane includes a vane stem that extends through the opening in the casing and through the bushing and washer. The bushing and washer are referred to herein as a bearing assembly. The bearing assembly produces a low friction surface that prevents metal on metal contact between the vane stem and the casing. Such variable vane assemblies have possible air leakage pathways through the openings in the casing. Also, the high velocity and high temperature air causes oxidation and erosion of the bearing assembly, which may accelerate deterioration of the bearing assembly, lead to failure of the bearing assembly, and eventual failure of the variable vane assembly.

To improve the overall operation of the compressor, several compressor stator vanes are rotatively mounted to allow each vane to rotate around its longitudinal axis (which extends in a radial direction from the centerline of the engine) to adjust the angular orientation of the vane relative to the airflow through the compressor. A lever arm is fixedly joined to the vane stem extending outwardly from the vane bushing. The distal end of the lever arm is operatively joined to an actuation ring that controls the angle of the vane. All of the vane lever arms in a single row are joined to a common actuation ring for ensuring that all of the variable vanes are simultaneously positioned relative to the airflow in the compressor stage at the same angular orientation.

Once the bearing assembly fails, an increase in leakage through the opening occurs, which results in a performance loss for the compressor. In addition, failure of the bearing assembly can result in contact between the stator vane and the casing, which causes wear and increases overhaul costs of the engine.

Known bearing assemblies have been fabricated from Vespel, a specially developed polymer having the highest temperature application for polymeric sliding bearings. These Vespel bearings have an upper temperature limit of 600° F., but extended operation at these temperatures limit their life. Vespel parts do not withstand the combination of high temperature and vibration loading well, leading to a relatively short part life. Therefore, these parts have an extended life when operating in the temperature range of 450–500° F. Accordingly, it would be desirable to provide bearing assemblies fabricated from materials having performance characteristics that will reduce or eliminate air leakage between the stator vane stem and the compressor casing while providing an increase in the durability of the bushing and washer to increase part life in high temperature and vibration loading applications. The present invention fulfills this need, and further provides related advantages.

BRIEF SUMMARY OF THE INVENTION

Materials, heretofore unknown for use in bearing assemblies, which produce equal or better wear resistance at reduced materials cost have been identified. These alternatives fall into three general categories: (1) solid materials from which bushings and washers can be fabricated, (2) coatings bonded to metallic bushings to minimize total system wear, and (3) solid lubricant coatings placed on any bushing or vane trunnion to reduce friction. A large number of combinations therefore exist that can provide solutions to specific mechanical designs. Each design is subjected to different temperature limitations, stresses and cyclic vibrations. Thus a solution for one system may not be an effective solution for a different mechanical system. In addition, the solution must be cost effective for the mechanical system into which it is installed. The present invention provides an effective and cost effective replacement for Vespel or carbon bushing systems currently used in the CFM 56, GE-90 and GP-7000 engine systems. The bushing systems of the present invention replace existing bushing systems that are used between vanes made from A286 material, a stainless steel or titanium alloy 6-4 and casings made from M152 material, a steel.

The present invention utilizes a ceramic bushing comprising either silicon nitride ($Si_3N_4$), tungsten carbide (WC) or zirconium oxide ($ZrO_2$). These bushings are strong but relatively inflexible. The vane trunnion, is coated with a tungsten carbide coating or a modified tungsten carbide, that is a tungsten carbide with a small amount of cobalt (WC—Co) sufficient to impart wear resistance, typically about 6–20% by weight Co and preferably about 12% by weight Co. Alternatively, the trunnion may be coated with a plasma vapor deposited (PVD) titanium nitride or tungsten carbide.

A topical friction modifier, a solid lubricant, may be applied between the tungsten carbide coated vane and the bushing.

One advantage of the present invention is that the bearing assembly materials significantly improve the service life of the stator vane assembly and reduce air leakage through the opening in the stator casing.

Another advantage is that the bearing assembly provides an efficiency improvement in the turbine engine while reducing overhaul costs caused by metal on metal contact between the stator casing and the stator vane.

Yet another advantage of the present invention is that the materials used in the improved bushing and vane design of the present invention can readily withstand the higher temperatures of operation utilized in current advanced engine designs. The materials used in the improved bushing and vane design of the present invention can be utilized at temperatures as high as 1000° F. without deterioration due to the combined effects of temperature, stress and vibration.

Other features and advantages of the present invention will be apparent from the following more detailed description of the preferred embodiment, taken in conjunction with the accompanying figures which illustrate, by way of example, the principles of the invention.

DETAILED DESCRIPTION OF THE INVENTION

Figure 1:
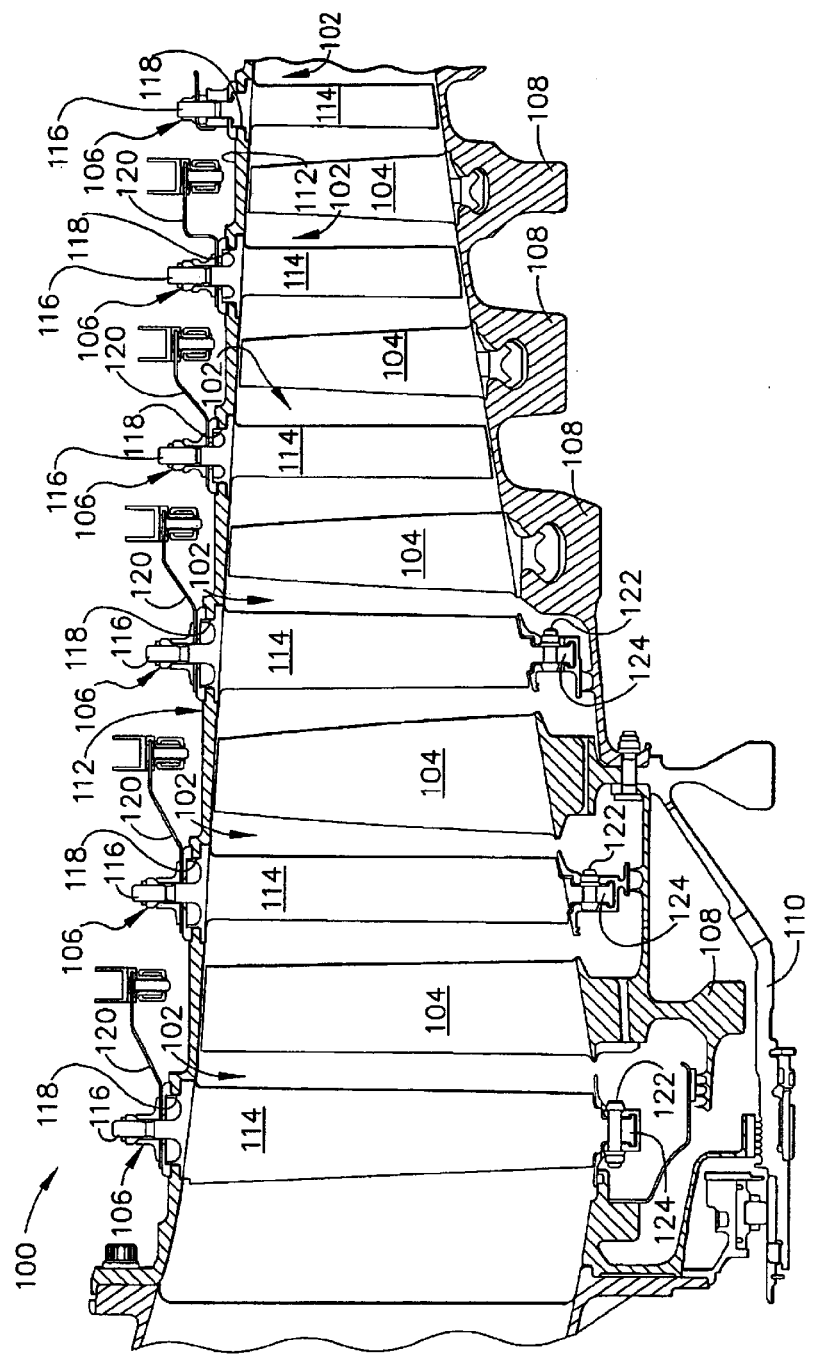
FIG. 1 is a schematic view of a portion of a prior art high pressure compressor for a turbine engine.

FIG. 1 is a schematic view of a section of a known high pressure compressor 100 for a turbine engine (not shown). Compressor 100 includes a plurality of stages 102, and each stage 102 includes a row of rotor blades 104 and a row of variable stator vane assemblies 106. Rotor blades 104 are typically supported by rotor disks 108, and are connected to a rotor shaft 110. Rotor shaft 110 is a high pressure shaft that is also connected to a high pressure turbine (not shown). Rotor shaft 110 is surrounded by a stator casing 112 that supports variable stator vane assemblies 106.

Each variable stator vane assembly 106 includes a variable vane 114 and a vane stem 116. Vane stem 116 protrudes through an opening 118 in casing 112. Variable vane assemblies 106 further include a lever arm 120 extending from variable vane 114 that is utilized to rotate variable vanes 114. The orientation of vanes 114 relative to the flow path through compressor 100 controls air flow therethrough. Some variable vane assemblies 106 are secured to shroud 124 by bolts 122.

Variable vane assemblies 106 control air flow through compressor 100. However, variable vane assemblies 106 also provide a potential pathway for air flow to exit compressor 100, such as through openings 118. The loss of air flow through openings 118 reduces the efficiency of compressor 100.

Figure 2:
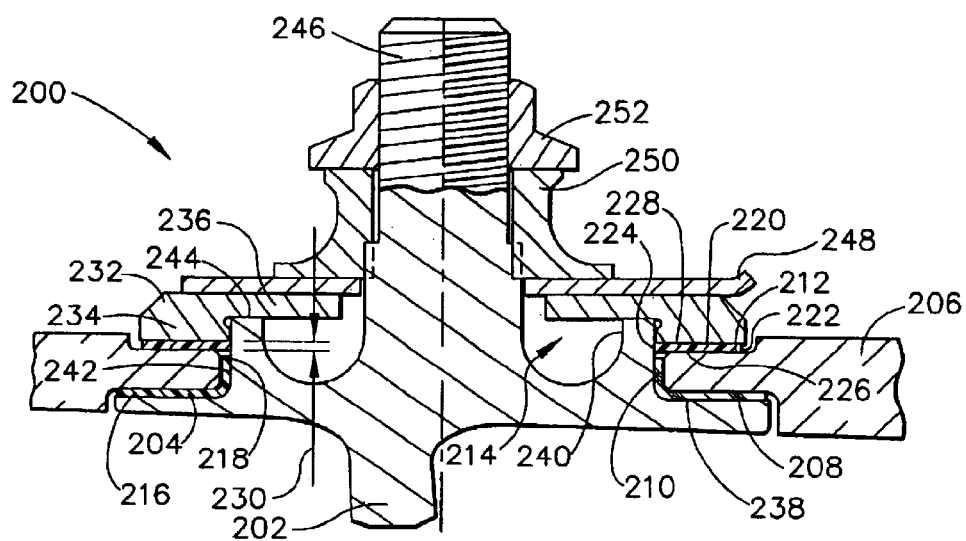
FIG. 2 is a cross-sectional view of a prior art variable vane assembly used in an aircraft turbine engine high pressure compressor.

FIG. 2 is a schematic view of a known variable vane assembly 200. Variable vane assembly 200 includes a variable vane 202. A bushing 204 is positioned on variable vane 202. A casing 206 supports variable vane 202 and includes a first recessed portion 208, an inner portion 210, and a second recessed portion 212. An opening 214 is formed by inner portion 210.

Bushing 204 includes a first portion 216 and a second portion 218. Bushing first portion 216 is in direct contact with casing first recessed portion 208 and separates variable vane 202 from casing 206. Bushing second portion 218 contacts casing inner portion 210 and separates variable vane 202 from casing 206. Bushing first portion 216 extends substantially an entire length of casing first recessed portion 208. In addition, bushing second portion 218 extends substantially an entire length of casing inner portion 210 and is substantially perpendicular to bushing first portion 216. Bushing 204 prevents variable vane 202 from directly contacting casing 206.

Variable vane assembly 200 further includes a washer 220. Washer 220 is substantially flat and includes an outer diameter surface 222 and an inner diameter surface 224. More specifically, washer 220 includes a first wall 226, a second wall 228, and a thickness 230 that is substantially constant from outer diameter surface 222 to inner diameter surface 224. Washer 220 is in direct contact with casing second recessed portion 212 and extends substantially an entire length of casing second recessed portion 212.

Variable vane assembly 200 includes a spacer 232 in contact with washer 220. Washer 220 prevents contact between spacer 232 and casing second recessed portion 212. Spacer 232 includes a first portion 234 and a second portion 236. Spacer first portion 234 contacts washer 220 and has a length substantially equal to a radial length of washer 220. Spacer 232 is separated from bushing 204 by washer 220. Bushing 204 and washer 220 do not contact each other. Washer 220 prevents spacer 232 from contacting casing 206.

Variable vane 202 also includes a first portion 238, a ledge 240 having an outer portion 242, and a spacer seating portion 244. Ledge 240 surrounds a vane stem 246. Vane stem 246 (corresponding to FIG. 1, 116) and ledge 240 extend through opening 214 (corresponding to FIG. 1, 118) in casing 206 (corresponding to FIG. 1, 112). Bushing second portion 218 extends along inner portion 210 of casing 206. Bushing second portion 218 prevents ledge outer portion 242 from contacting casing inner portion 210.

Variable vane assembly 200 also includes a lever arm 248 positioned around vane stem 246 and contacting spacer 232. Lever arm 248 is utilized to adjust the angle of variable vane 202, and thus alter the flow of air through the compressor.

In addition, variable vane assembly 200 includes a sleeve 250 contacting lever arm 248, and a lever arm nut 252 contacting sleeve 250. Lever arm nut 252 cooperates with vane stem 246 and maintains variable vane assembly 200 in contact with casing 206.

Variable vane assembly 200 is assembled by placing bushing 204 on variable vane 202 such that first portion 216 and second portion 218 contact variable vane 202 and are substantially perpendicular. Variable vane 202 and bushing 204 extend through opening 214.

Washer 220 is placed on casing 206 adjacent bushing 204. Spacer 232 is positioned on variable vane 202 and contacts washer 220. Lever arm 238 is positioned over vane stem 246 and contacts spacer 232. Sleeve 250 is positioned over vane stem 246 and contacts lever arm 248. Finally, lever arm nut 252 is positioned over vane stem 246 and contacts sleeve 250.

Washer 220 and bushing 204 form a bearing assembly used in variable vane assembly 200 and may be used, for example, in a high pressure compressor. Washer 220 and bushing 204 may be utilized in other environments such as a rotor vane assembly, a low pressure compressor variable vane assembly, a high pressure turbine, or a low pressure turbine.

Materials, heretofore unknown for use in bearing assemblies, which produce equal or better wear resistance at reduced materials cost have been identified. These alternatives fall into three general categories: (1) solid materials from which bushings and washers can be fabricated, (2) coatings bonded to metallic bushings and/or vanes to minimize total system wear, and (3) solid lubricant coatings placed on any bushing and/or the vane stem or bushing fitted over the vane stem to reduce friction.

Solid bushings and washers are fabricated by well known techniques, such as an injection molding process or by forming a predetermined shape under pressure, then sintering at high temperature to burn away organic binder and fuse the ceramic particles. Ideally, the solid bushing should be durable with good wear characteristics, however, the bushing should wear before the case and vane stem (either coated or uncoated) because the bushing is the least expensive and most easily replaced component.

Such solid materials include injection molded silicon-nitride such as $Si_3N_4$, and injection molded zirconia. The present invention utilizes either a $Si_3N_4$ or $ZrO_2$ for the bushing. These bushing materials provide improved wear and higher temperature capability than existing Vespel bushings.

The bushing assembly can assume several configurations. The least expensive alternative utilizes plain bushings with washers as described above instead of flanged bushings. This minimizes possible tensile forces that could cause failure of the ceramic. Two alternative configurations of the spacer bushing that separate the bearing bushing are envisioned. Both of these spacer bushing designs increase the flexibility of the spacer so it may act with the flexibility of a seal.

Figure 3:
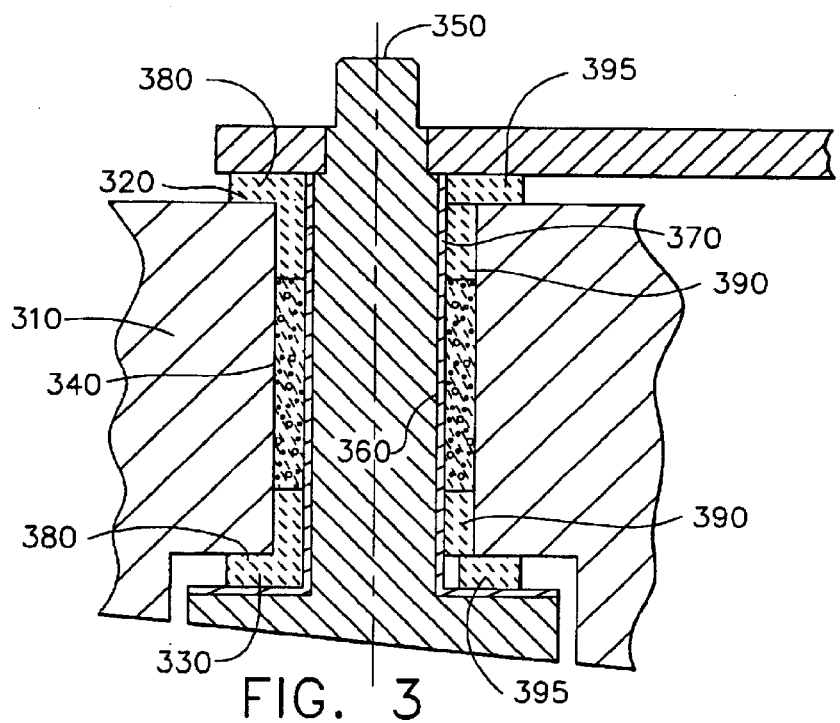
FIG. 3 is a cross sectional view of a bushing assembly of the present invention used in a variable vane assembly of the present invention.

Referring to FIG. 3, which depicts a bushing configuration of the present invention, a bushing assembly 310 is comprised of a first end 320, a second end 330 and a seal tube portion 340 intermediate between the first end 320 and the second end 330. The first end 320 and second end 330 can be either a flanged section 380 or a straight section 390 with washers 395, all comprised of the same material. The stainless steel vane 350 extends through bushing assembly 310. The ceramic materials, silicon nitride, tungsten carbide or zirconia, used for these bushings are both strong and stiff. However, the performance of the seal tubes comprising these materials can be improved by reducing the elastic modulus of the seal tube portion 340 of the bushing. This is accomplished by including between about 10% to about 35% by volume closed porosity, and preferably up to 20% closed pore porosity, in this portion of the bushing. By including closed pore porosity in the seal tube portion 340 of the bushing, even though the seal tube portion 340 is comprised of the same material as the dense bearing bushing at first end 320 and second end 330, the seal tube portion 340 of the bushing has an elastic modulus that is less than the elastic modulus of either first end 320 and second end 330, about 50% less when there is 20% closed porosity. The advantage of having a lower elastic modulus in the seal tube portion 340 of bushing assembly 310 is that interface forces that normally are present in a bushing with a uniform elastic modulus are transmitted to either first end 320 or second end 330. This reduces interface forces and wear in the critical seal area and further extends the life of the bushing assembly 310.

Figure 4:
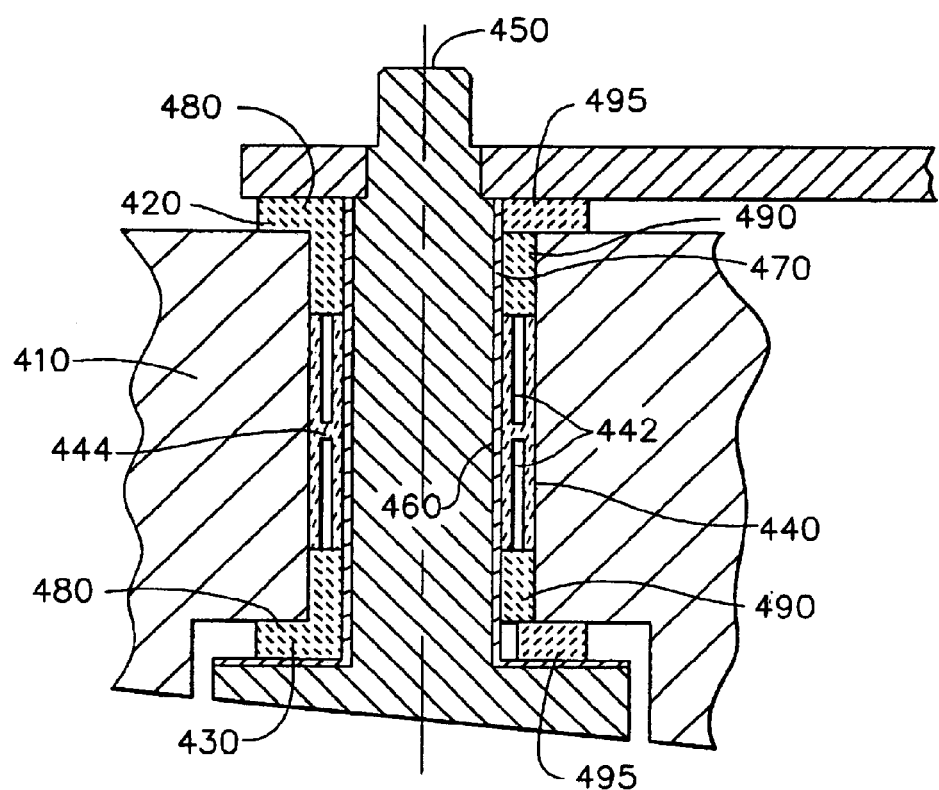
FIG. 4 is a cross sectional view of a bushing assembly of the present invention used in a variable vane assembly of the present invention depicting a seal tube portion having an H-profile.

Referring now to FIG. 4, there is depicted a second embodiment of a bushing assembly 410. Like bushing assembly 310 depicted in FIG. 3, bushing assembly 410 is a silicon nitride, tungsten carbide or alternatively, a zirconium oxide material. A stainless steel vane stem 450 extends through bushing assembly 410. Bushing assembly 410 includes a first end 420 and a second end 430. First end 420 and second end 430 may be flanged section 480, as shown on the left side of FIG. 4 or may be a washer 495 and straight bushing 490, as shown on the right side of FIG. 4. Bushing assembly 410 also includes a seal tube portion 440 that has an improved elastic flexibility. However, the improved flexibility is achieved by an H-profile, which includes two circumferential voids 442 separated by a connecting segment 444. This arrangement in cross-section such as given in FIG. 4, appears as an H and hence is referred to as a H-profile. The seal tube portion 440 is made from the same material as the first end 420 and second end 430. The seal tube portion 440 is modified to provide improved flexibility. As should be clear, the H-profile in the seal tube portion 440 results in this section of the bushing being more flexible. As a result, interface forces in this area as a result of contact between bushing 410 and vane stem 450 are transmitted to first end 420 and second end 430 both of which are dense and stiff. This extends bushing life in the seal tube region 440 while minimizing frictional forces in the seal tube region. Of course, the flexibility of an H-profile seal tube made with 20% closed-pore porosity would be even more flexible.

Coatings typically are bonded to metallic surfaces to reduce friction forces and minimize total system wear. These coatings typically include WC and WC—Co. Materials receiving these coatings may be, for example, nickel-based, such as INCO 718 and stainless steels, such as Nitronic 60. In this manner a more cost efficient metal may be coated to achieve superior wear performance at reduced overall cost. The present invention provides a variation to such a system. In the present invention, to further reduce the wear and friction forces between the stainless steel vane, 350 and 450 in FIGS. 3 and 4 respectively, and the ceramic bushing assemblies, 310, 410, the stainless steel vane 350, 450 is coated with a WC, titanium nitride or WC—Co coating 360, 460 in FIGS. 3 and 4 respectively. The coating may be applied by a plasma spray technique or other suitable method known in the art. The preferred plasma spray technique is high velocity oxy-fuel (HVOF) spraying, although other plasma spray techniques such as low pressure plasma spray (LPPS) can be used to successfully apply the coating. This wear resistant coating improves the wear at the interface between bushing assemblies 310, 410 and vane stem 350, 450 thereby decreasing wear of vane stems 350, 450 and further extending the life of this variable stator vane bushing and seal material system. Alternatively, a relatively thin coating may be applied by Physical Vapor Deposition (PVD) when less wear protection is required. These wear resistant coatings may be applied to a thickness as low as 0.0002 inches and as high as 0.010 inches without significant problems. Preferably the coating thicknesses are between about 0.001–0.005 inches, and most preferably the coating thickness is about 0.003 inches.

The present invention also utilizes a solid, but soft, friction modifier coating placed between the bushing and the WC or WC—Co coated vane. This friction modifier coating is depicted at location 370 and 470 in FIGS. 3 and 4 respectively. This friction modifier coating comprises either a sodium silicate or aluminum phosphate binder plus a friction modifying agent, such as carbon in the form of graphite, dispersed substantially uniformly through the coating. The friction modifier coating further reduces the coefficient of friction between bushing assemblies 310, 410 and vane stem 350, 450. The friction modifier coating may eventually be consumed, but, with proper design, it can remain effective for the entire life of the variable stator vane bushing and seal material system. Of the two friction modifier coatings, aluminum phosphate is preferred as sodium silicate is slightly soluble in the presence of water or water vapor.

The variable stator vane bushing and seal materials set forth in the best mode of practicing the present invention more than double the wear life in the engine systems in which they are used. The combinations of the present invention assure reduced coefficients of friction, in the range of 0.2–0.6, over the life of the system. This is significant, as systems have been designed to accommodate coefficients of friction as high as 0.95, which occur as bushing and wear materials deteriorate. This 100% increase is important if failures are substantially reduced or eliminated between scheduled engine overhaul periods. Such improvements can result in the reduction in size, and hence weight of the actuation mechanism of the variable guide vanes, including the lever arms.

Tests for various combinations of bushings and vanes have been conducted and are presented herein.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A variable stator vane assembly for use in a compressor section of a turbine engine, comprising:
   a plurality of movable stator vanes, the vanes including a wear resistant coating selected from the group consisting of tungsten carbide and modified tungsten carbide;
   a steel stator casing supporting the vanes;
   bushing systems positioned between the stator vanes and the stator casings, each bushing systems comprising a ceramic bushing, the ceramic bushing selected from the group of ceramic materials consisting of silicon nitride, tungsten carbide and zirconium oxide; and
   a topical friction modifier applied between the wear resistant coated vanes and the bushing systems, the topical friction modifier comprising a friction modifying agent and a binder selected from the group consisting of aluminum phosphate, sodium silicate and combinations thereof.

2. The stator vane assembly of claim 1 wherein the modified tungsten carbide coating applied to the stator vanes includes tungsten carbide having about 12 w/o Cobalt.

3. A variable stator vane assembly for use in a compressor section of an aircraft turbine engine, comprising:
   a plurality of movable vanes;
   a lever arm attached to the vanes for positioning the vanes;
   a casing having a plurality of first recessed portions, a plurality of second recessed portions and inner portions having an opening between the plurality of first and second recessed portions;
   a plurality of bushing assemblies positioned between the casing and the movable vanes, a bushing assembly corresponding to each vane, with the vane extending through the bushing assembly, each bushing assembly comprised of a first end, a second end and a seal tube portion intermediate between the first end and the second end; and
   wherein the first end, the second end and the seal tube portion are comprised of an identical wear resistant ceramic material, wherein the ceramic material is characterized by high strength and stiffness, and wherein the seal tube portion is characterized by a lower stiffness and an improved flexibility than the first end and the second end of the bushing assembly so that interface forces resulting from contact between the seal tube portion and the vane are transmitted to the ends of the bushing assembly.

4. The stator vane assembly of claim 3 wherein the wear resistant ceramic material comprising the bearing assembly is selected from the group consisting of silicon nitride, tungsten carbide and zirconia.

5. The stator vane assembly of claim 3 wherein the first end of the bushing assembly is a flanged section attached to a straight section, wherein the straight section extends into the casing opening and between the vane and the casing, and the flanged section is positioned in the first recessed portion of the casing.

6. The stator assembly of claim 3 wherein the first end of the bushing assembly further comprises of a straight section and a washer, wherein the straight section extends into casing opening and between the vane and the casing and the washer is positioned in the first recessed portion of the casing.

7. The stator vane assembly of claim 3 wherein the second end of the bushing assembly is a flanged section.

8. The stator assembly of claim 3 wherein the second end of the bushing comprises a straight section and a washer.

9. The stator vane assembly of claim 3 wherein the seal tube portion is comprised of the same wear resistant ceramic material as the first end and the second end, and wherein the seal tube portion further includes from about 10% by volume to about 35% by volume closed porosity.

10. The stator vane assembly of claim 9 wherein the seal tube portion further includes about 20% by volume closed porosity.

11. The stator vane assembly of claim 9 wherein the wear resistant ceramic material is selected from the group consisting of silicon nitride, tungsten carbide and zirconia, and wherein the elastic modulus of the seal tube portion is about 50% less than the elastic modulus of the first end and the second end so that interface forces in the seal tube area are reduced thereby reducing wear in the seal tube area.

12. The stator vane assembly of claim 3 wherein the seal tube portion includes at least two circumferentially extending apertures separated by a connecting segment.

13. The stator vane assembly of claim 12 wherein the seal tube portion has a cross-sectional profile in the form of an H.

14. The stator vane assembly of claim 12 wherein the wear resistant ceramic material comprising the bearing assembly is selected from the group consisting of silicon nitride, tungsten carbide and zirconia.

15. The stator vane assembly of claim 14 wherein the wear resistant ceramic material comprising the seal tube portion further includes up to about 20% by volume closed-pore porosity.

16. The stator vane assembly of claim 3 wherein each vane further includes a wear-resistant coating applied to at least an interface between the vane and the bushing assembly.

17. The stator assembly of claim 16 wherein the wear resistant coating is selected from the group consisting of tungsten carbide, modified tungsten carbide and titanium nitride.

18. The stator assembly of claim 17 further including a friction modifier coating applied along the interface between the coated vane and the bushing assembly.

19. The stator assembly of claim 18 wherein the friction modifier coating is an aluminum phosphate binder that further includes a friction modifying agent uniformly dispersed through the coating.

20. The stator assembly of claim 19 wherein the friction modifying agent is a carbon-based material.

21. The stator assembly of claim 18 wherein the friction modifier coating is a sodium silicate binder that further includes a friction modifying agent uniformly dispersed through the coating.

22. The stator assembly of claim 21 wherein the friction modifying agent is a carbon-based material.

23. The stator assembly of claim 16 wherein the coating is applied to a thickness of from about 0.0002 to about 0.010 inches.

24. A variable stator vane assembly for use in a compressor section of an aircraft turbine engine, comprising:
   a plurality of movable vanes, each vane having a vane stem, the vane stem including an applied wear-resistant coating;
   a lever arm attached to the vanes for positioning the vanes;
   a casing having a plurality of first recessed portions, a plurality of second recessed portions and inner portions having an opening between the plurality of first and second recessed portions;
   a plurality of bushing assemblies positioned between the casing and the movable vanes, a bushing assembly corresponding to each vane, with the vane extending through the bushing assembly, each bushing assembly comprised of a first end, a second end and a seal tube portion intermediate between the first end and the second end, wherein the first end, the second end and the seal tube portion are comprised of an identical wear resistant ceramic material, and wherein opposed surfaces of the vane stem and seal tube form an interface, wherein the ceramic material is characterized by high strength and stiffness and the seal tube portion is characterized by a lower stiffness and an improved flexibility than the first end and the second end of the bushing assembly so that interface forces resulting from contact between the seal tube portion and the vane are transmitted to the ends of the bushing assembly; and
   a friction modifier coating applied along the interface between the coated vane stem and the seal tube.

25. The stator assembly of claim 24 wherein the friction modifier coating is an aluminum phosphate binder that further includes a friction modifying agent uniformly dispersed through the coating.

26. The stator assembly of claim 25 wherein the friction modifying agent is a carbon-based material.

27. The stator assembly of claim 24 wherein the friction modifier coating is a sodium silicate binder that further includes a friction modifying agent uniformly dispersed through the coating.

28. The stator assembly of claim 27 wherein the friction modifying agent is a carbon-based material.

29. The stator assembly of claim 24 wherein the wear resistant coating applied to the vane stem is selected from the group consisting of tungsten carbide, modified tungsten carbide and titanium nitride.

30. The stator assembly of claim 29 wherein the coating is applied to a thickness of from about 0.0002 inches to about 0.010 inches.

31. The stator vane assembly of claim 24 wherein the wear resistant ceramic material comprising each bearing assembly is selected from the group consisting of silicon nitride, tungsten carbide and zirconia.

32. The stator vane assembly of claim 31 wherein the seal tube portion is further characterized by from about 10% to about 35% closed pore porosity.

33. The stator vane assembly of claim 32 wherein the seal tube portion is further characterized by about 20% closed pore porosity.

34. The stator vane assembly of claim 31 wherein the seal tube portion is further includes at least two circumferentially extending apertures separated by a connecting segment.

* * * * *

UNITED STATES PATENT AND TRADEMARK OFFICE
CERTIFICATE OF CORRECTION

PATENT NO. : 7,094,022 B2  Page 1 of 1
APPLICATION NO. : 10/445428
DATED : August 22, 2006
INVENTOR(S) : Bruce It is certified that error appears in the above-identified patent and that said Letters Patent is hereby corrected as shown below:

Column 9, line38, "a plurality of bushing assemblies positioned" should be --the plurality of bushing assemblies positioned--.

Signed and Sealed this

Seventeenth Day of April, 2007

JON W. DUDAS
*Director of the United States Patent and Trademark Office*